(12) United States Patent
Liu

(10) Patent No.: US 12,174,127 B2
(45) Date of Patent: Dec. 24, 2024

(54) MAPPING DEVICE AND A LOADPORT HAVING THE SAME

(71) Applicant: HIWIN TECHNOLOGIES CORP., Taichung (TW)

(72) Inventor: Jonus Liu, Taichung (TW)

(73) Assignee: HIWIN Technologies Corp., Taichung (TW)

( * ) Notice: Subject to any disclaimer, the term of this patent is extended or adjusted under 35 U.S.C. 154(b) by 267 days.

(21) Appl. No.: 17/809,736

(22) Filed: Jun. 29, 2022

(65) Prior Publication Data

US 2024/0003825 A1 Jan. 4, 2024

(51) Int. Cl.
*G01N 21/95* (2006.01)

(52) U.S. Cl.
CPC ... *G01N 21/9501* (2013.01); *G01N 2201/022* (2013.01)

(58) Field of Classification Search
CPC . H01L 21/673; H01L 21/677; G01N 21/9501; G01B 11/002; G01B 11/14; G01B 11/22; G01B 11/24
See application file for complete search history.

(56) References Cited

U.S. PATENT DOCUMENTS

| | | | | |
|---|---|---|---|---|
| 2007/0081886 A1* | 4/2007 | Myoung | ............ | H01L 21/67775 414/806 |
| 2012/0067770 A1* | 3/2012 | Hatano | ............. | H01L 21/67379 206/710 |
| 2015/0308812 A1* | 10/2015 | Natsume | ........... | H01L 21/67265 356/612 |
| 2024/0120222 A1* | 4/2024 | Yu | .......................... | G01B 11/14 |

FOREIGN PATENT DOCUMENTS

| JP | 4501755 | B2 | | 7/2010 |
| JP | 2010219209 | A | | 9/2010 |
| JP | 2014143388 | A | | 8/2014 |
| JP | 2015050410 | A | | 3/2015 |
| JP | 2015211164 | A | | 11/2015 |
| JP | 6227334 | B2 | * | 11/2017 |
| KR | 20220050868 | A | | 4/2022 |
| TW | I661496 | B | | 6/2019 |

* cited by examiner

*Primary Examiner* — Michelle M Iacoletti
*Assistant Examiner* — Joshua M Carlson
(74) *Attorney, Agent, or Firm* — Rosenberg, Klein & Lee

(57) ABSTRACT

A mapping device is adapted for detecting a plurality of test objects disposed in a container, and arranged along a detecting direction. The mapping device includes: a first sensor group defining a first optical axis, and adapted to be disposed at a front side of the container to move in the detecting direction for detecting the test objects; and a second sensor group defining a second optical axis, and adapted to be disposed at the front side of the container to move in the detecting direction for detecting the test objects. The second optical axis is inclined relative to the first optical axis, and is disposed ahead of the same in a front-rear direction of the container and at a downstream side of the same in the detecting direction.

9 Claims, 15 Drawing Sheets

MAPPING DEVICE AND A LOADPORT HAVING THE SAME

FIELD

The disclosure relates to a mapping device, and more particularly to a mapping device and a loadport having the same.

BACKGROUND

Referring to FIG. 1, Japanese Patent No. 4501755 discloses a semiconductor mapping device 101 that includes a mapping frame 11, and a pair of wafer-protrusion detecting sensors 12 and a pair of scanning sensors 13 that are mounted on the mapping frame 11. The wafer-protrusion detecting sensors 12 are disposed at the same height as the scanning sensors 13, and are disposed at inner sides of the scanning sensors 13. As such, the wafer-protrusion detecting sensors 12 are able to detect whether an edge of a wafer 14 deviates or protrudes from its normal position toward the mapping device 101 to ensure that the scanning sensors 13 do not hit the edge of the wafer 14 during a testing process. However, since the wafer-protrusion detecting sensors 12 and the scanning sensors 13 are disposed at the same height, when the mapping device 101 is used to scan a large-sized wafer (e.g., a 12-inch wafer), if the edge of the wafer 14 deviates greatly toward the mapping device 101, the scanning sensors 13 may hit and break the edge of the wafer 14 when the wafer-protrusion detecting sensors 12 performs the detecting operation.

Referring to FIGS. 2 and 3, to solve the above-mentioned problem, Taiwanese Invention Patent No. I661496B discloses a wafer mapping device 102 that includes a pair of wafer-protrusion detecting sensors disposed below a pair of scanning sensors 16. Due to the height difference between the wafer-protrusion detecting sensors 15 and the scanning sensors 16, the wafer-protrusion detecting sensors 15 are able to detect the protruding edge of the wafer 14 before the scanning sensors 16 hit the wafer 14. However, the wafer-protrusion detecting sensors 15 may have a similar problem of hitting a protruding wafer 14, and thus a third sensor 17 is disposed between the wafer-protrusion detecting sensors 15 to prevent the wafer-protrusion detecting sensors 15 from hitting the wafer 14. However, an increased number of sensors can result in complicated wiring.

SUMMARY

Therefore, the object of the disclosure is to provide a mapping device and a loadport having the mapping device that can alleviate the drawback of the prior art.

According to the disclosure, the mapping device is adapted for detecting a plurality of test objects disposed in a container that has front and rear sides and top and bottom sides. The test objects are arranged along a detecting direction. The mapping device includes a first sensor group and a second sensor group.

The first sensor group defines a first optical axis, and is adapted to be disposed at the front side of the container to move in the detecting direction relative to the container for detecting any of the test objects.

The second sensor group defines a second optical axis, and is adapted to be disposed at the front side of the container to move in the detecting direction relative to the container for detecting any of the test objects.

The second optical axis is inclined relative to the first optical axis, is disposed ahead of the first optical axis in a front-rear direction of the container perpendicular to the detecting direction, and is disposed at a downstream side of the first optical axis in the detecting direction.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
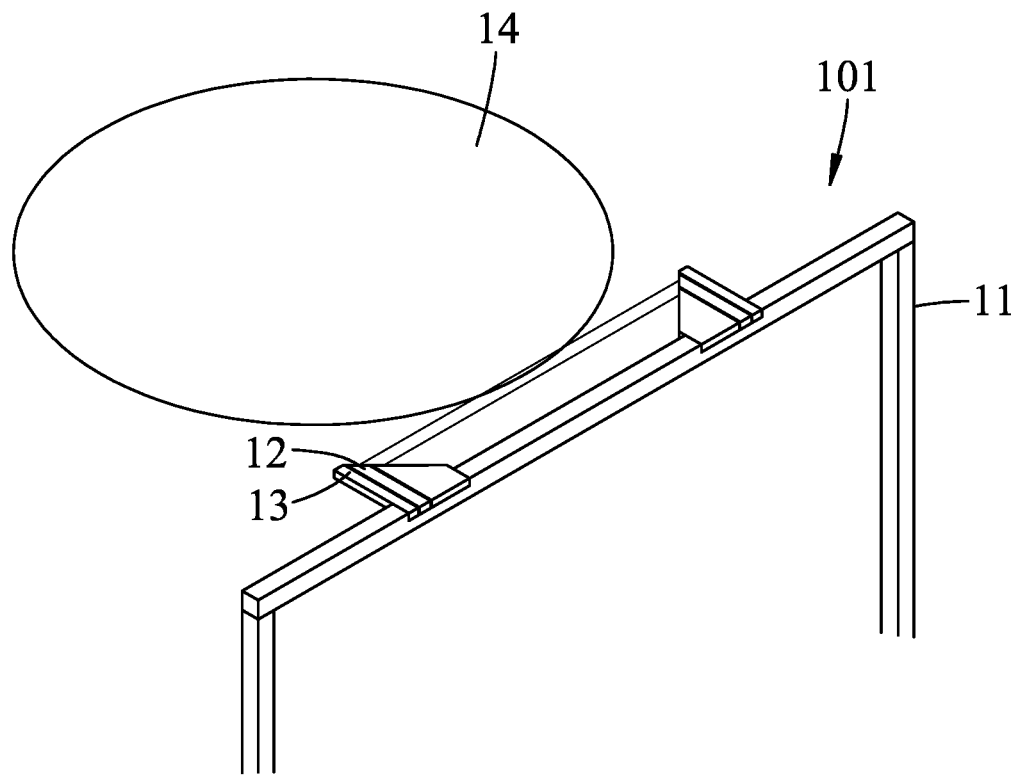
FIG. 1 is a schematic perspective view illustrating a semiconductor mapping device disclosed in Japanese Patent No. 4501755.
Figure 2:
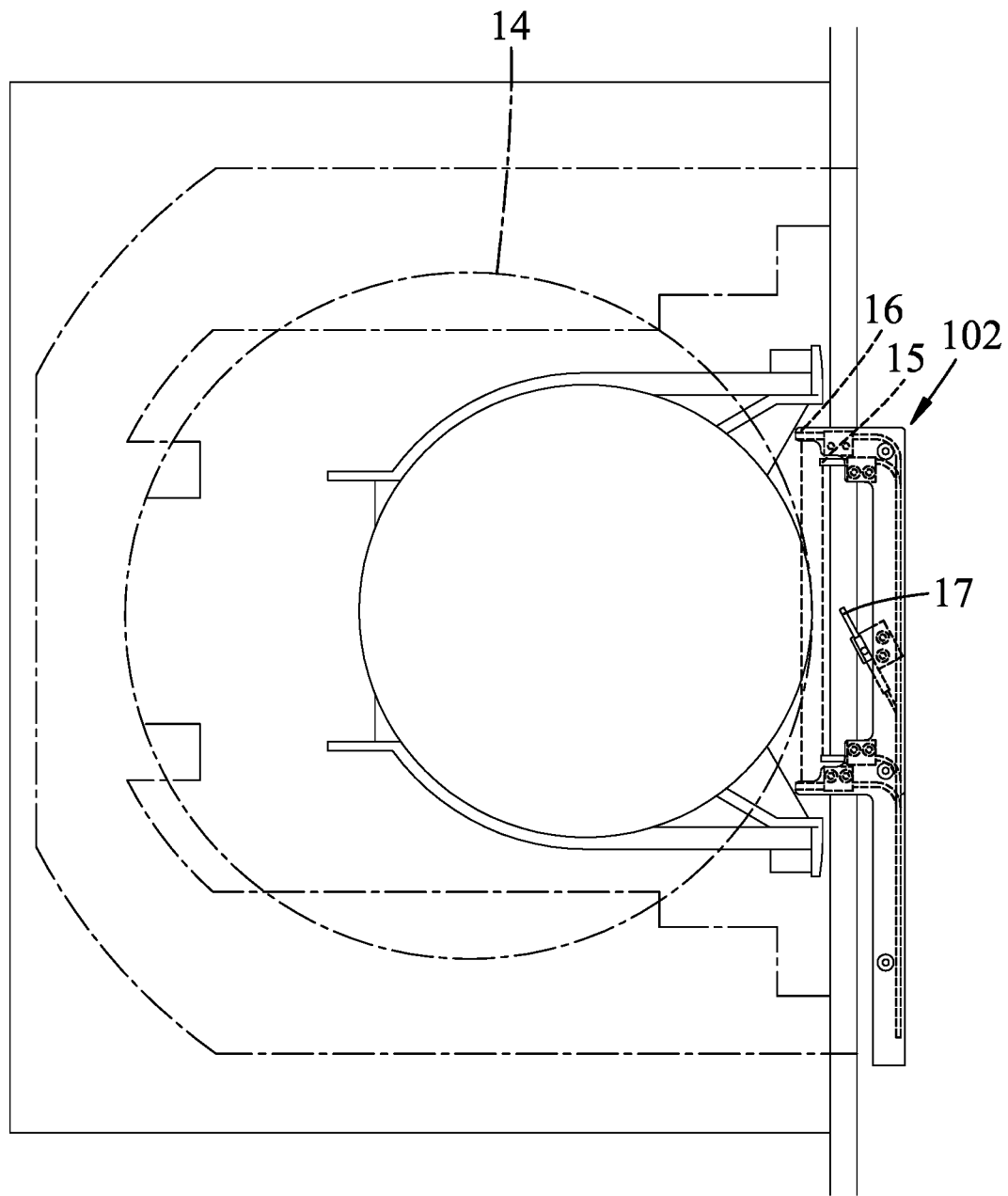
FIG. 2 is a schematic plan view illustrating a wafer mapping device disclosed in Taiwanese Invention Patent No. I661496B.
Figure 3:
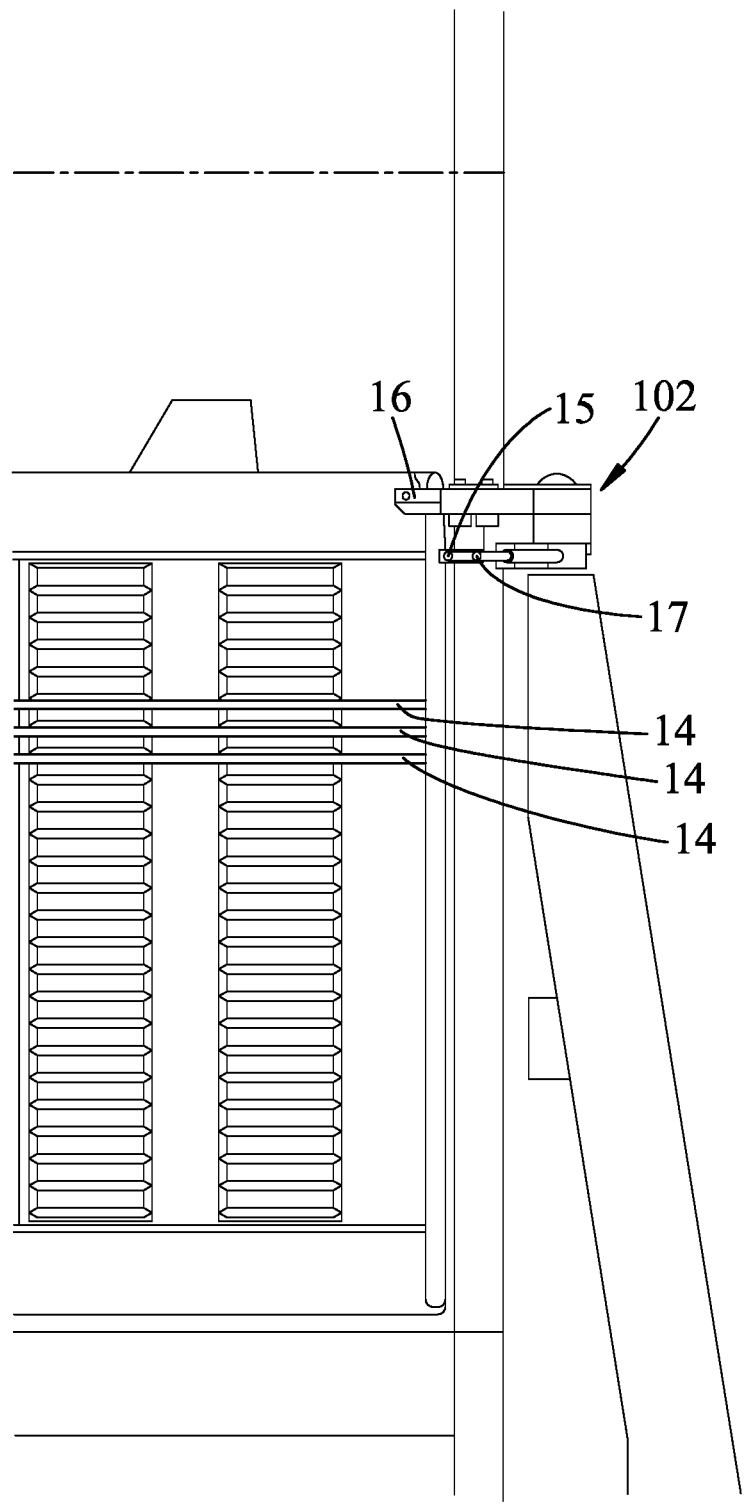
FIG. 3 is a schematic side view of the wafer mapping device disclosed in Taiwanese Invention Patent No. I661496B.
Figure 4:
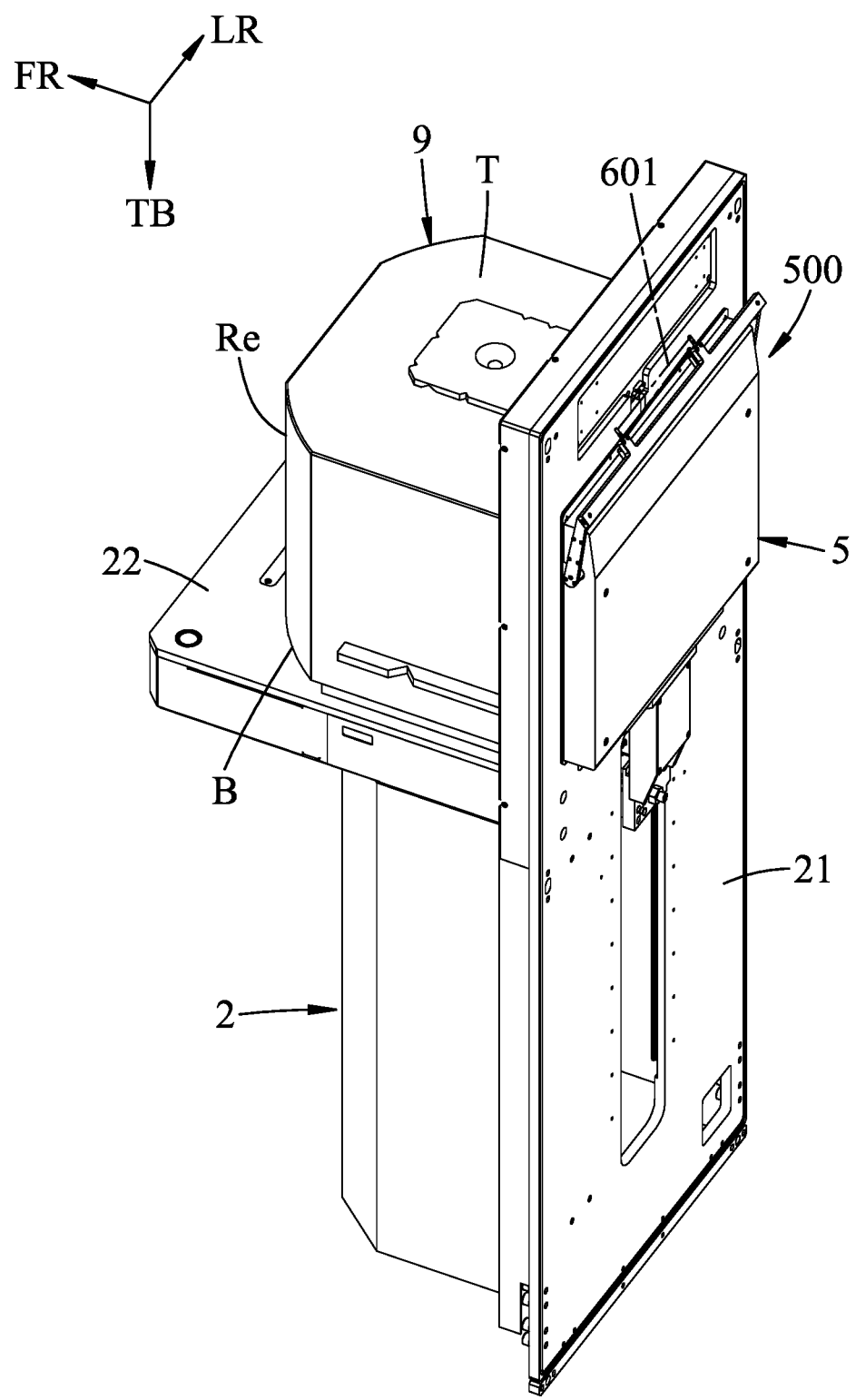
FIG. 4 is a perspective view of an embodiment of a loadport according to the present disclosure.
Figure 5:
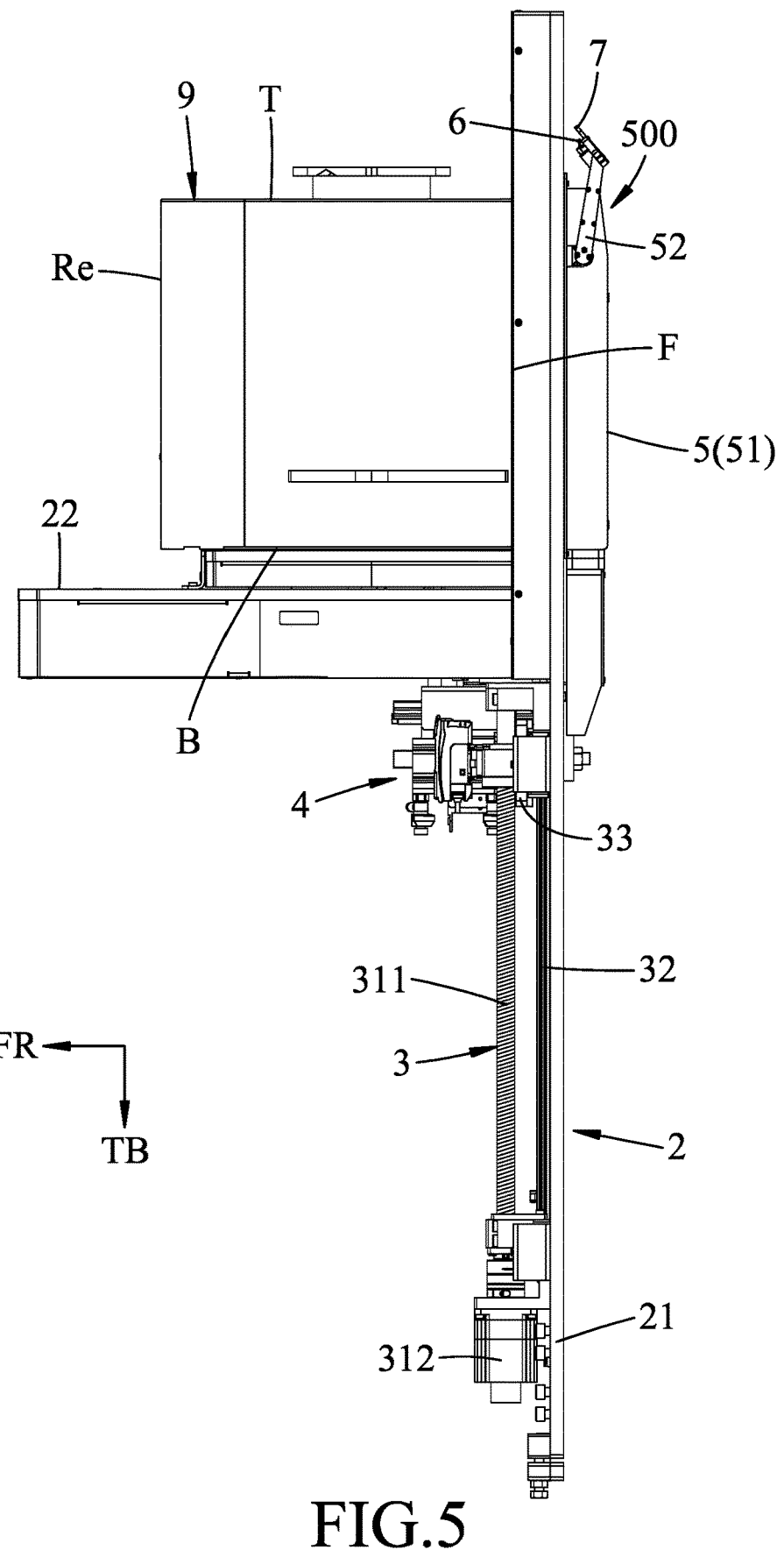
FIG. 5 is a fragmentary side view of the embodiment.
Figure 6:
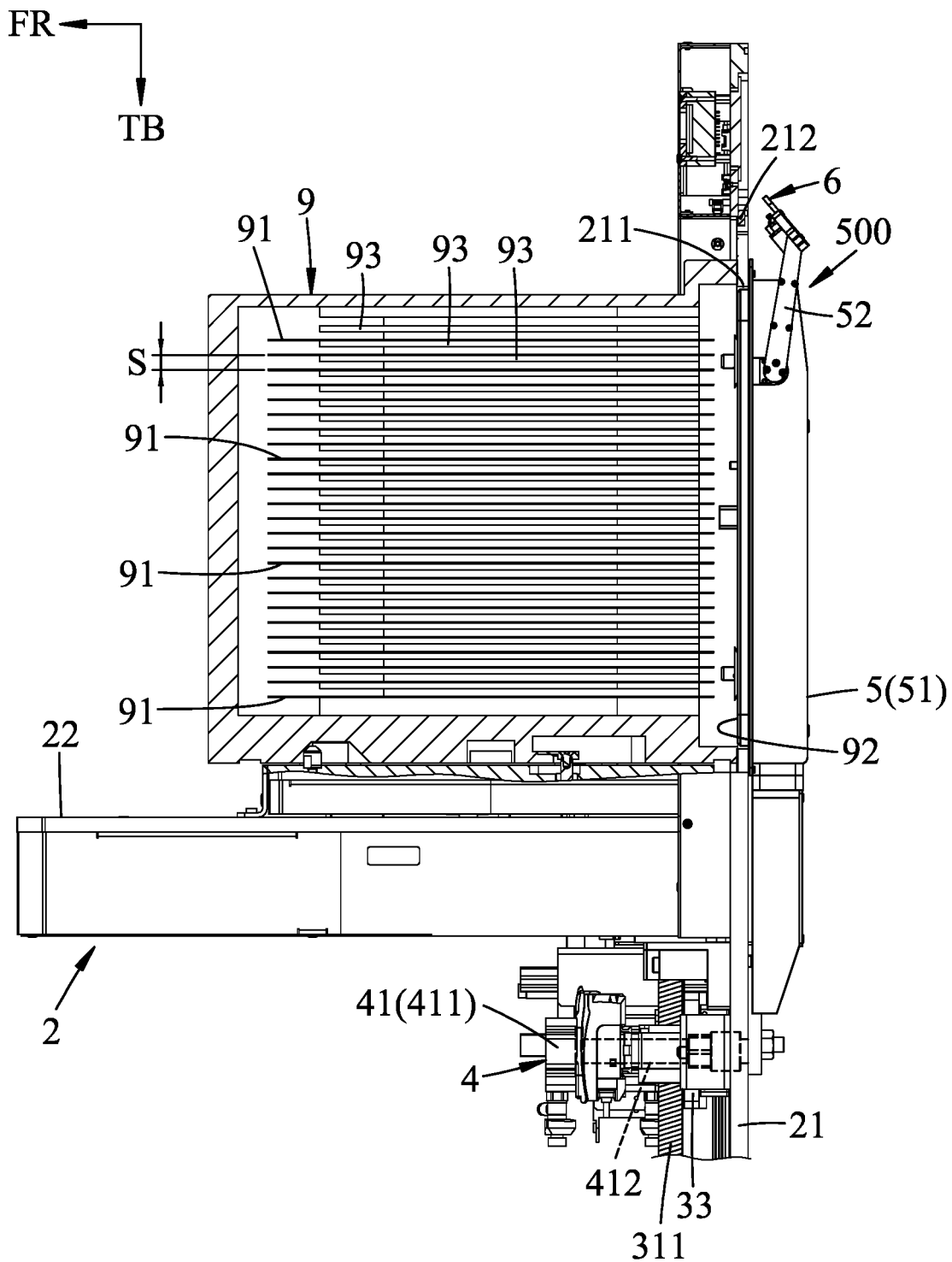
FIG. 6 is a fragmentary and partially cross-sectional view of the embodiment, illustrating a mapping device of the embodiment at a closed position relative to a base seat.

Referring to FIGS. 4 to 6, an embodiment of a loadport according to the disclosure is adapted for detecting a plurality of test objects 91 disposed in a container 9. The container 9 has front, rear, top and bottom sides (F, Re, T, B), and a container opening 92 disposed at the front side (F). A plurality of spacers 93 are disposed inside the container 9 and are arranged along a detecting direction (D) to support the test objects 91. The spacers 93 are arranged equidistantly such that any two adjacent ones of the spacers 93 are spaced apart by a spacing distance (S). In the present embodiment, the container 9 is a 12-inch wafer carrier having a cover plate (not shown) that covers the container opening 92, and the test objects 91 are 12-inch wafers. However, the test objects 91 are not limited to wafers; in variations of the embodiment, the test objects 91 may be substrates or semi-finished products of semiconductor devices.

The loadport includes a base seat 2, a lifting mechanism 3, an opening-closing mechanism 4, and a mapping device 500.

The base seat 2 is configured for placement of the container 9, and includes a supporting board 21 extending along a top-bottom direction (TB) of the container 9, and a platform 22 mounted atop the supporting board 21. The supporting board 21 has a loading opening 211, and a fixed sensor 212 disposed at the loading opening 211. The fixed sensor 212 is adapted for detecting whether any of the test objects 91 protrudes from the container opening 92 of the container 9. In the present embodiment, the fixed sensor 212 is a transmissive optical sensor. The platform 22 is disposed at a rear side of the supporting board 21 in a front-rear direction (FR) of the container 9 perpendicular to the top-bottom direction (TB). The container 9 is placed on the platform 22 with the container opening 92 registered with the loading opening 211 of the supporting board 21. It should be noted that, in the present embodiment, the detecting direction (D) is same as the top-bottom direction (TB).

Figure 7:
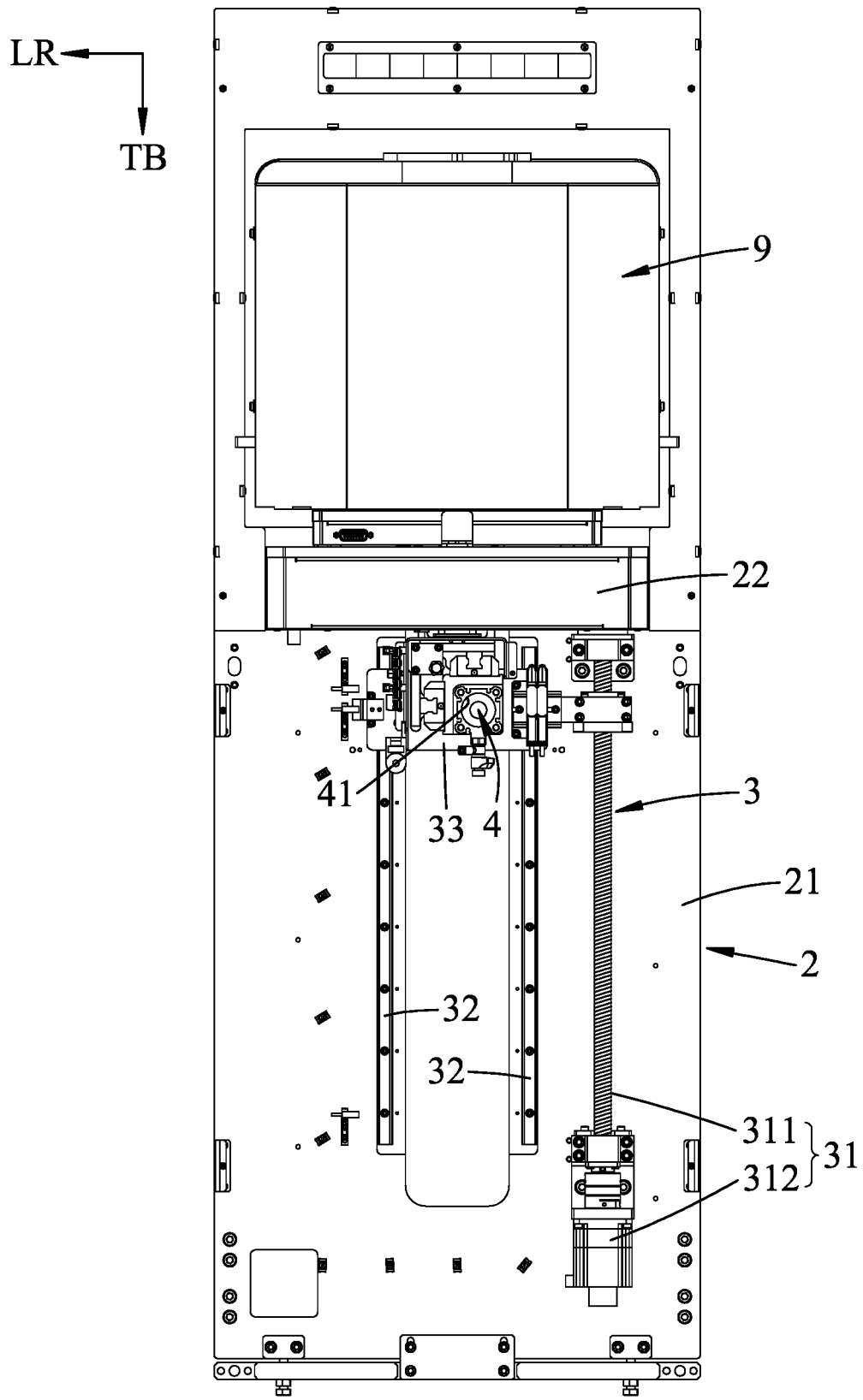
FIG. 7 is a fragmentary rear view of the embodiment, illustrating a lifting mechanism mounted to the base seat.

Referring to FIGS. 5 to 7, the lifting mechanism 3 is mounted to the supporting board 21 of the base seat 2 and is disposed below the platform 22. The lifting mechanism 3 includes a lifting device 31, two guide rails 32 and a slider 33. The lifting device 31 includes a leadscrew 311 that extends along the top-bottom direction (TB), and a lifting driver 312 that is a motor and that is connected to a bottom end of the leadscrew 311 for driving rotation of the leadscrew 311. The guide rails 32 extend along the top-bottom direction (TB), are spaced apart from each other along a left-right direction (LR) of the container 9 perpendicular to the top-bottom direction (TB) and the front-rear direction (FR), and are mounted to the supporting board 21. The slider 33 is threadedly engaged with the leadscrew 311 and is slidably mounted to the guide rails 32, such that the rotation of the leadscrew 311 drives sliding movement of the slider 33 relative to the guide rails 32 along the top-bottom direction (TB). In variations of the embodiment, the lifting device 31 may be a pneumatic cylinder, an electric cylinder, a linear motor, a belt drive, a rack and pinion drive or similar component that is capable of driving movement of the slider 33 along the top-bottom direction (TB).

Figure 8:
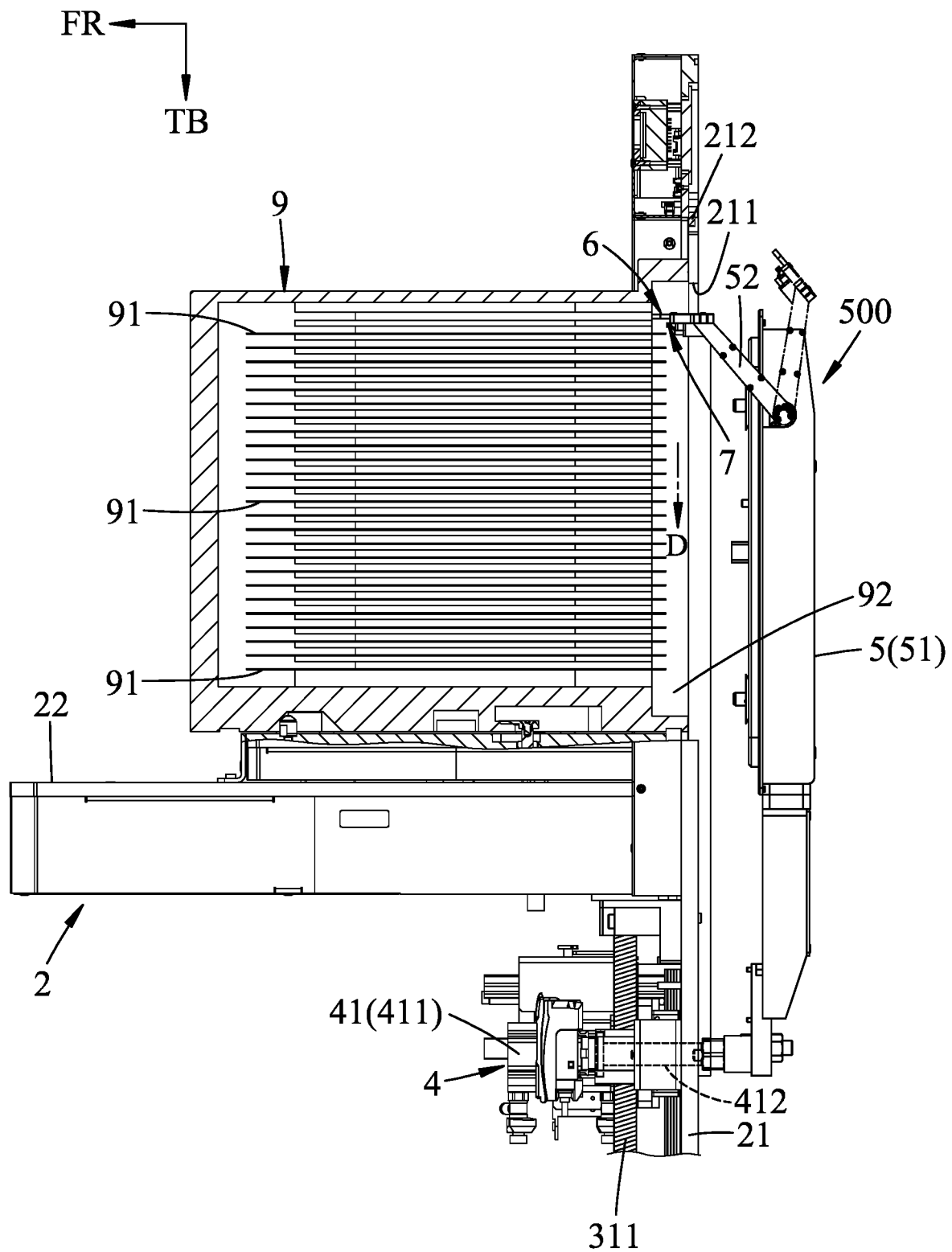
FIG. 8 is a view similar to FIG. 6, illustrating the mapping device at an open position relative to the base seat, and a frame member of the mapping device being pivotable relative to a door member.

Referring to FIGS. 6 to 8, the opening-closing mechanism 4 is mounted to the slider 33 of the lifting mechanism 3, and includes an opening-closing driver 41. In the present embodiment, the opening-closing driver 41 is a pneumatic cylinder; however, it may be an electric cylinder, a motorized leadscrew, a belt drive, a rack and pinion drive or similar component in variations of the embodiment. The opening-closing driver 41 includes a driver body 411 that is connected to the slider 33, and a piston rod 412 that is connected to the driver body 411 and that is telescopically movable along the front-rear direction (FR) relative to the driver body 411.

The mapping device 500 is co-movably connected to an end of the piston rod 412 of the opening-closing mechanism 4, such that the mapping device 500 is drivable by the piston rod 412 to move along the front-rear direction (FR). The mapping device 500 includes a moving door 5 fixed to the piston rod 412, and a first sensor group 6 and a second sensor group 7 mounted to the moving door 5. The mapping device 500 is drivable by the opening-closing mechanism 4 to move relative to the base seat 2 between a closed position (see FIG. 6), where the moving door 5 covers the loading opening 211 of the supporting board 21, and an open position (see FIG. 8), where the moving door 5 is separated away from the loading opening 211 of the supporting board 21 such that the loading opening 211 is exposed to the external environment.

Figure 9:
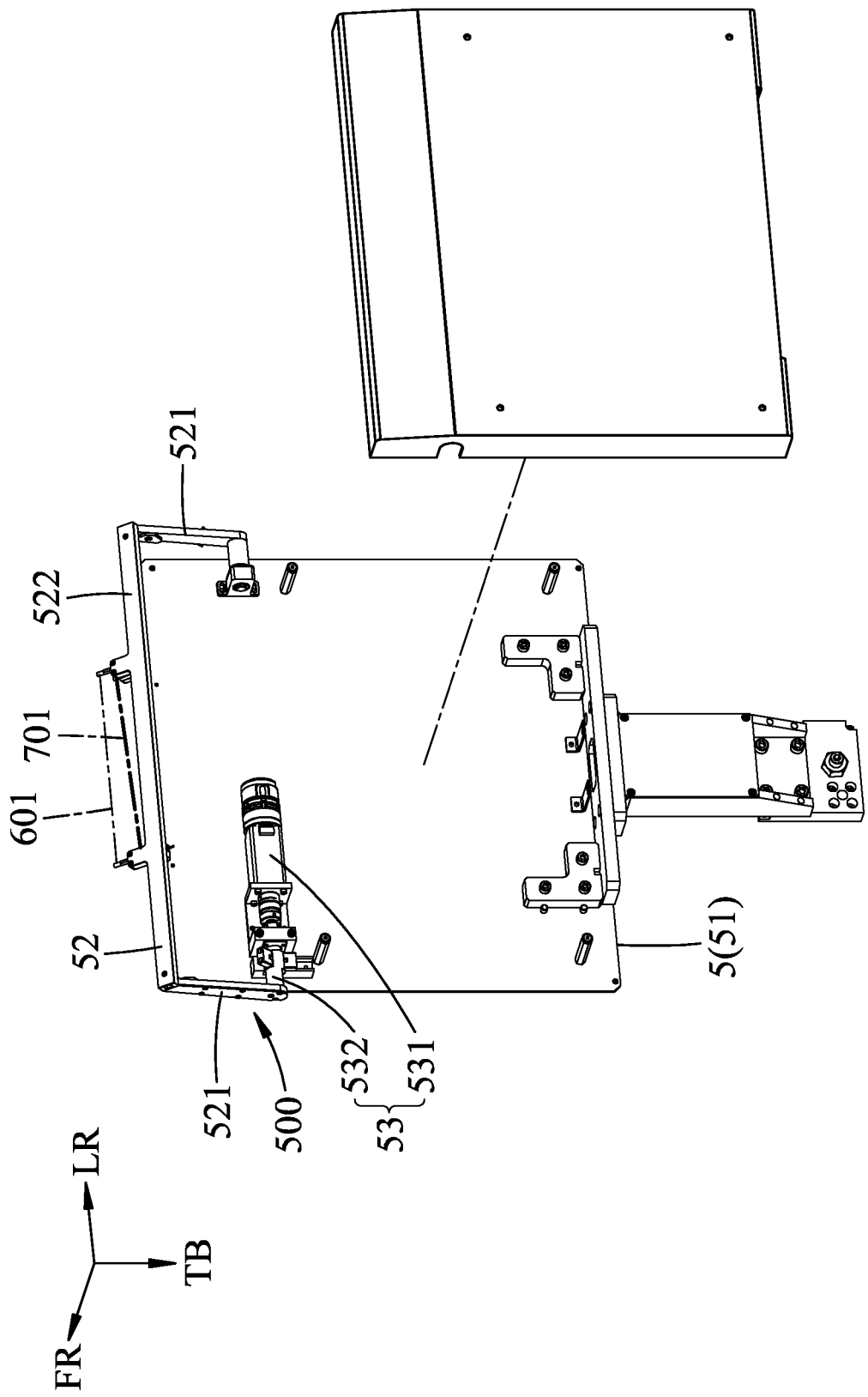
FIG. 9 is an exploded perspective view of the mapping device, illustrating a frame drive unit of the mapping device used for driving pivotal movement of the frame member.
Figure 10:
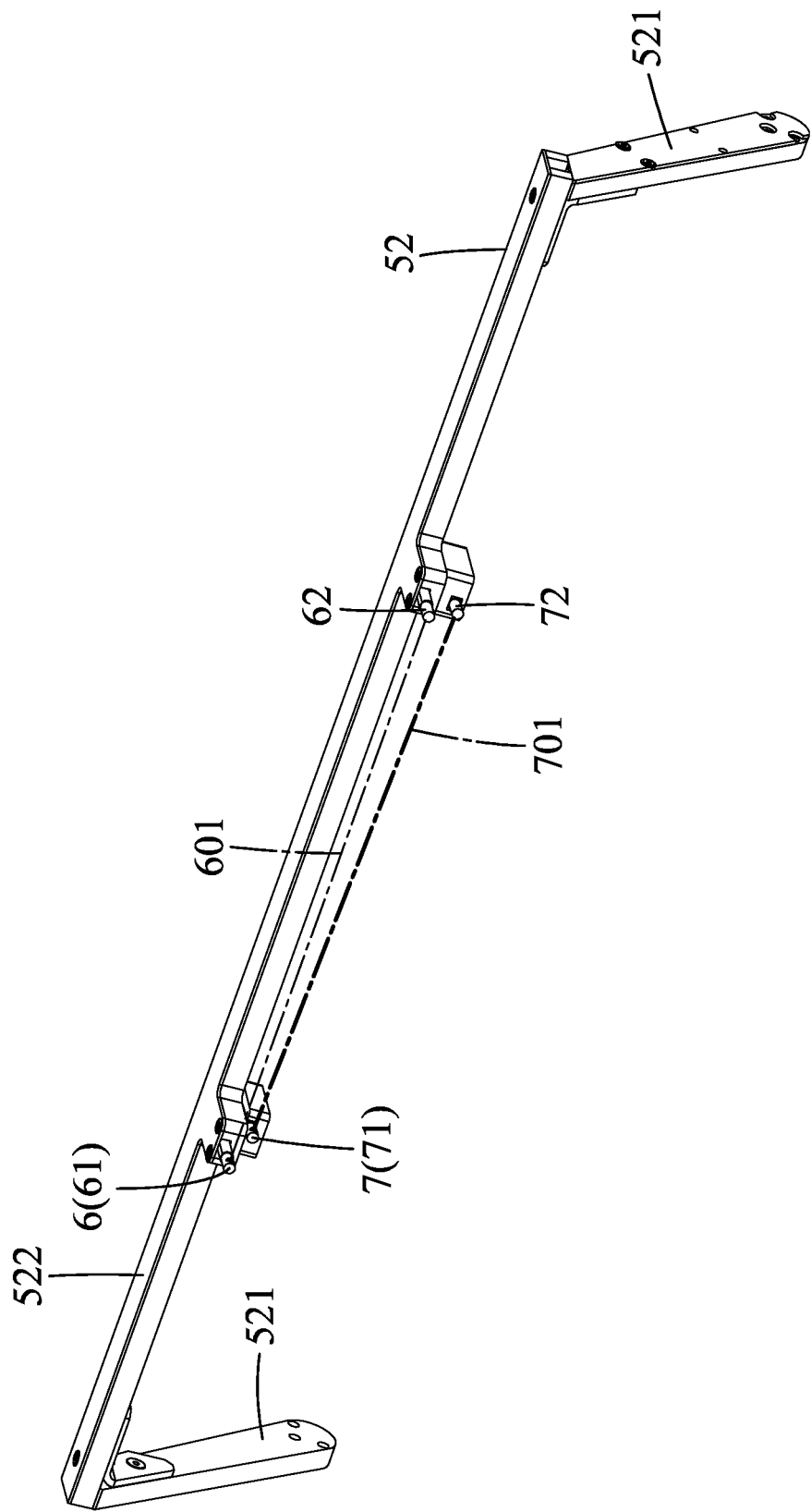
FIG. 10 is a perspective view illustrating a first sensor group and a second sensor group of the mapping device that are mounted to the frame member.

Referring to FIGS. 8 to 10, the moving door 5 includes a door member 51 that is fixed to the piston rod 412 of the opening-closing driver 41 and that is movable with the piston rod 412 in the detecting direction (D) relative to the container 9, a frame member 52 that is pivotally connected to a top portion of the door member 51, and a frame driver unit 53 that is mounted in the door member 51 and that is configured to drive pivotal movement of the frame member 52. Specifically, the door member 51 has an inner space that receives the frame driver unit 53. The frame member 52 has two side bars 521 that are spaced apart from each other along the left-right direction (LR) and that are pivotally connected to opposite sides of the door member 51, and a cross bar 522 that extends along the left-right direction (LR) and that is connected between the side bars 521. The frame driver unit 53 has a frame driver 531 that is fixed in the inner space of the door member 51, and a rotating shaft 532 that extends along the left-right direction (LR), and that is connected between the frame driver 531 and one of the side bars 521, such that the rotating shaft 532 is drivable by the frame driver 531 to further drive the pivotal movement of the frame member 52, during which the cross bar 522 of the frame member 52 is moved close to or away from the loading opening 211 of the base seat 2.

It should be noted that, in the present embodiment, the frame member 52 is configured to be pivotable relative to the door member 51 in order to prevent the first sensor group 6 and the second sensor group 7 from accidentally hitting and being damaged by the cover plate (not shown) of the container 9 when the mapping device 500 moves to the closed position. However, in variations of the embodiment, the frame member 52 may be configured to move horizontally relative to the door member 51 to prevent the hitting problems. Further, in other variations of the embodiment where the container 9 does not include a cover plate, the frame member 52 may be configured as being fixed to the door member 51 without the risk of damaging the first sensor group 6 and the second sensor group 7, and in these variations, the first sensor group 6 may be a reflective optical sensor.

Figure 11:
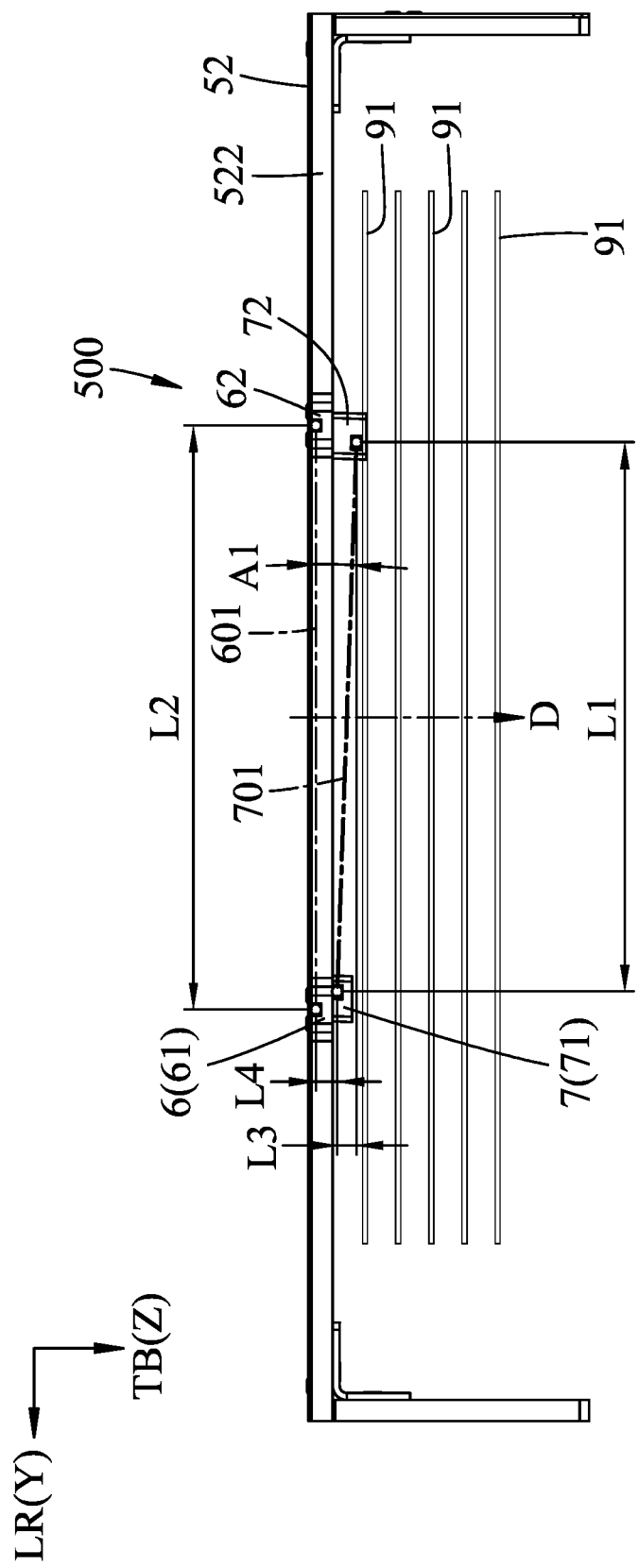
FIG. 11 is a schematic diagram illustrating a first optical axis of the first sensor group and a second optical axis of the second sensor group that are adapted for detecting a plurality of test objects.

Referring to FIGS. 8, 10 and 11, the first sensor group 6 and the second sensor group 7 are mounted to the cross bar 522 of the frame member 52 and are configured to move with the moving door 5 in the detecting direction (D) to detect the test object 91.

The first sensor group 6 includes a first sensor 61 and a second sensor 62 that are spaced apart from each other along the left-right direction (LR), and that are disposed at the same height along the top-bottom direction (TB). The first sensor 61 and the second sensor 62 cooperatively define therebetween a first optical axis 601 that is perpendicular to the detecting direction (D) (i.e., the first optical axis 601 has opposite ends respectively terminate at the first sensor 61 and the second sensor 62), and that is adapted to be disposed at the front side (F) of the container 9 to move in the detecting direction (D) relative to the container 9 for detecting any of the test objects 91. Specifically, the first optical axis 601 is configured to scan the test objects 91 for detecting improper placement of the test objects 91 (i.e., the wafers), such as wafer absence, double-stacking, or wafer cross-slotting, and other related information such as wafer thickness. In the present embodiment, the first sensor group 6 is a transmissive optical sensor. The first sensor 61 is a light emitter, and the second sensor 62 is a light receiver. However, configurations of the first sensor 61 and the second sensor 62 are not limited thereto, and may exchange with each other in variations of the embodiment (i.e., the first sensor 61 may instead be configured as the light receiver, and the second sensor 62 the light emitter). Further, in other variations of the embodiment, the first sensor group 6 may be configured as other types of optical sensors, such as a reflection type, as long as it provides the same function.

The second sensor group 7 is disposed at a level lower than the first sensor group 6 along the top-bottom direction (TB), and includes a third sensor 71 and a fourth sensor 72 that are spaced apart from each other in the left-right direction (LR). In the present embodiment, the second sensor group 7 is a transmissive optical sensor. The third sensor 71 is a light emitter, and the fourth sensor 72 is a light receiver. Similar to the first sensor 61 and the second sensor 62, configurations of the third sensor 71 and the fourth sensor 72 are not limited thereto, and may exchange with each other in variations of the embodiment.

The third sensor 71 is disposed proximal to the first sensor 61, and is disposed at a level lower than the first sensor 61 along the top-bottom direction (TB). The fourth sensor 72 is disposed proximal to the second sensor 62, and is disposed at a level lower than the second sensor 62 along the top-bottom direction (TB), and also lower than the third sensor 71 along the top-bottom direction (TB). A distance (L1) between the third sensor 71 and the fourth sensor 72 in the left-right direction (LR) is smaller than a distance (L2) between the first sensor 61 and the second sensor 62 in the left-right direction (LR). It should be noted that, since the first and second optical axes 601, 701 are disposed respectively at two levels that are different along the top-bottom direction (TB), in variations of the embodiment, the distance (L1) between the third sensor 71 and the fourth sensor 72 in the left-right direction (LR) may be designed to be greater than or equal to the distance (L2) between the first sensor 61 and the second sensor 62 in the left-right direction (LR) without the risk of interference between the first and second optical axes 601, 701.

Figure 12:
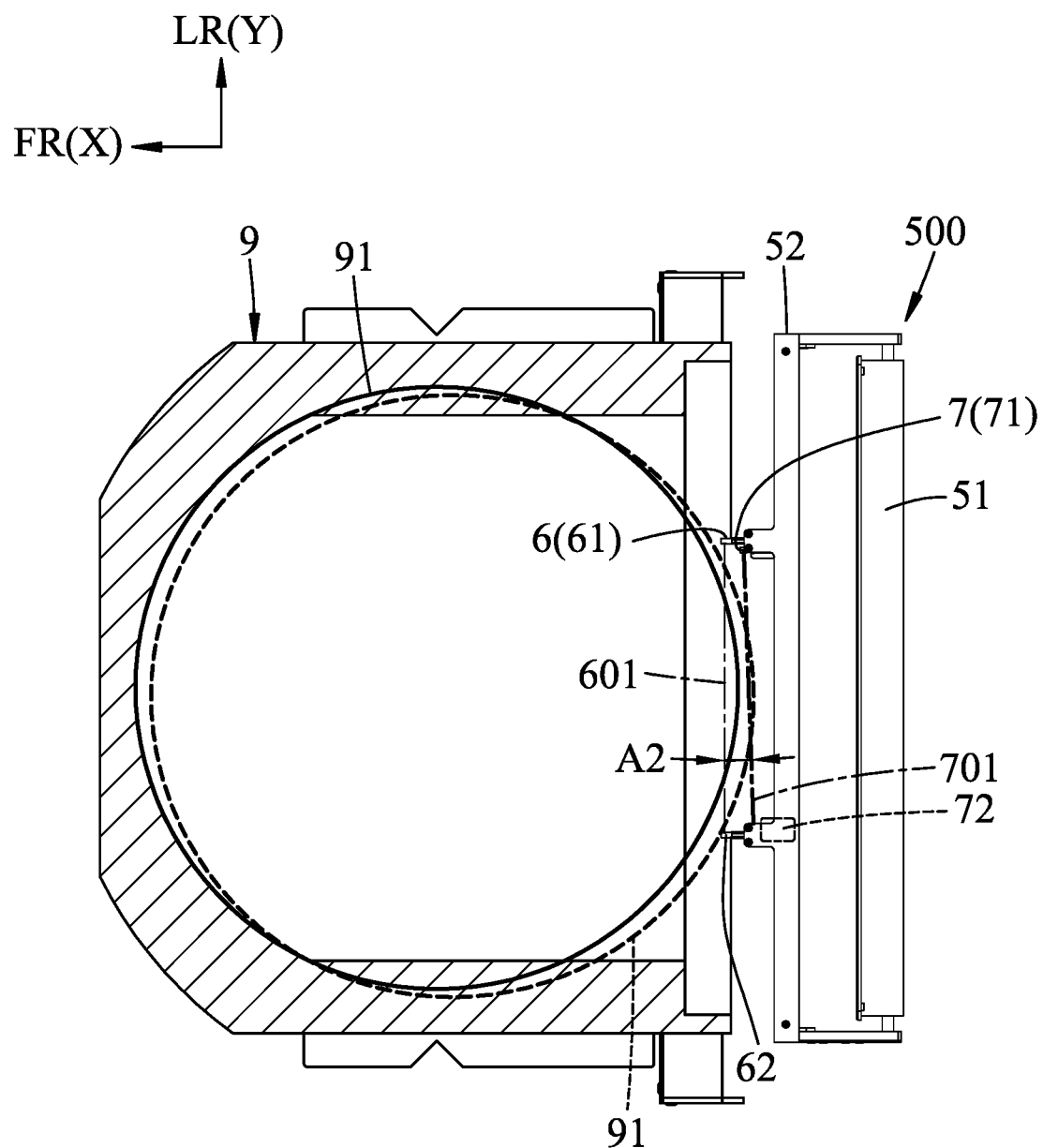
FIG. 12 is a partially cross-sectional view of the embodiment, illustrating the first optical axis and the second optical axis being used for scanning and detecting wafer protrusion, respectively.

Referring to FIGS. 10 to 12, the third sensor 71 and the fourth sensor 72 cooperatively define therebetween a second optical axis 701 (i.e., the second optical axis 701 has opposite ends respectively terminate at the third sensor 71 and the fourth sensor 72), and are adapted to be disposed at the front side (F) of the container 9 to move in the detecting direction (D) relative to the container 9 for detecting any of the test objects 91. Specifically, the second optical axis 701 is configured to detect whether the test objects 91 deviate or protrude from their normal positions (i.e., whether the wafers have protrusions).

For the sake of convenience, a coordinate system having X-axis, Y-axis and Z-axis is defined hereafter with the X-, Y- and Z-axes being parallel to the front-rear direction (FR), the left-right direction (LR) and the top-bottom direction (TB), respectively. In order to prevent the fourth sensor 72, which is disposed at the lowest level among all four sensors along the top-bottom direction (TB), from hitting any protruding test objects 91 before the protrusions are detected, the second optical axis 701 is configured to be inclined relative to the first optical axis 601 in a manner that the second optical axis 701 and the first optical axis 601, when being projected on a Y-Z plane of the coordinate system, form a first angle (A1) of larger than 0 degree and less than or equal to 15 degrees and, when being projected on an X-Y plane of the coordinate system, form a second angle (A2) of larger than 0 degree and less than or equal to 10 degrees. In addition, in variations of the embodiment, the first angle (A1) may be designed to be less than or equal to 10 degrees, and the second angle (A2) may be designed to be less than or equal to 5 degrees, such that the fourth sensor 72 does not interfere with the fixed sensor 212 (see FIG. 8) along the front-rear direction (FR), ensuring the ability of the fixed sensor 212 to detect maximum protrusions of the test objects 91.

Furthermore, since the second optical axis 701 has to move ahead of the first optical axis 601 in order to detect for protrusions before the first sensor group 6 hits the test objects 91, the second optical axis 701 is configured to be disposed at a downstream side of the first optical axis 601 in the detecting direction (D), and is disposed ahead of the first optical axis 601 in the front-rear direction (FR) of the container 9. It should be noted that, since the detecting direction (D) in the present embodiment is the same as the top-bottom direction (TB) (i.e., from top to bottom), the second optical axis 701 is disposed lower than the first optical axis 601 along the top-bottom direction (TB) (or Z-axis), and the fourth sensor 72 is disposed farther from the first optical axis 601 than the third sensor 71 in the detecting direction (D) and also in the front-rear direction (FR) of the container. However, in variations of embodiment, if the detecting direction (D) is reversed (i.e., from bottom to top), the second optical axis 701 has to be disposed higher than the first optical axis 601 along the Z-axis in order to move ahead of the first optical axis 601.

Referring to FIGS. 6, 8 and 11, in the present embodiment, in order to prevent the fourth sensor 72 from hitting the container 9 when the mapping device 500 moves to the test object 91 at the bottom of the container 9, a distance (L3) between the third sensor 71 and the fourth sensor 72 in the detecting direction (D) is configured to be smaller than or equal to two times of the spacing distance (S) between any two adjacent ones of the spacers 93. Further, in order for the second sensor group 7 to detect the test object 91 at the top of the container 9, the distance (L3) between the third sensor 71 and the fourth sensor 72 in the detecting direction (D) is configured to be smaller than a distance (L4) between the third sensor 71 and the first sensor 61 in the detecting direction (D).

Figure 13:
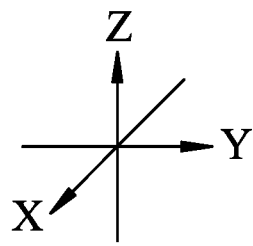
FIG. 13 is a schematic diagram illustrating positional relationship between the first optical axis and the second optical axis in a three-dimensional perspective.
Figure 13:
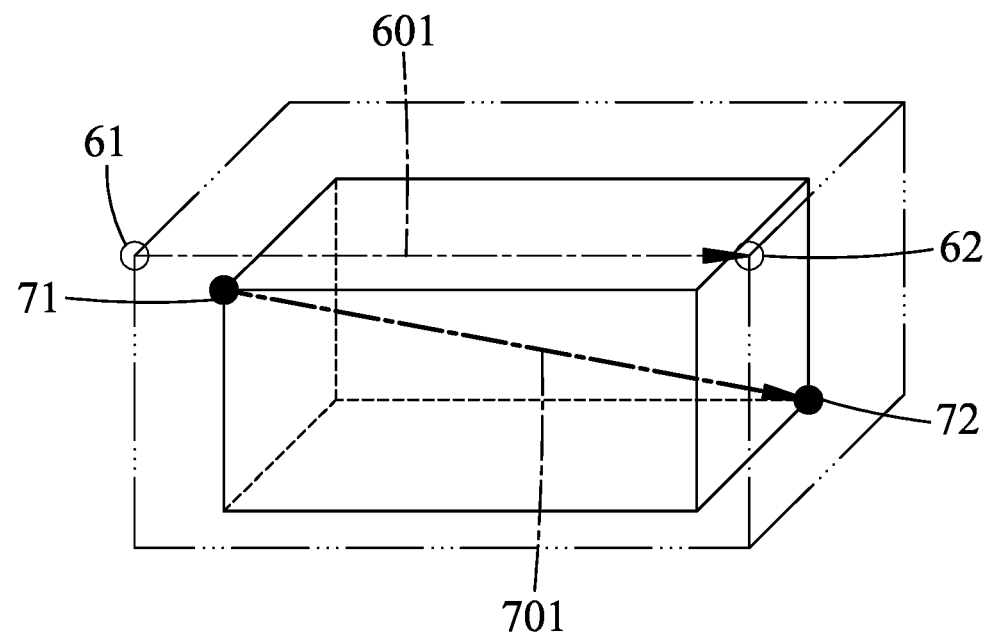

Referring to the schematic diagram in FIG. 13, the positional relationship between the first optical axis 601 and the second optical axis 701 is better illustrated in a three-dimensional perspective. By virtue of the asymmetrical configurations of the first optical axis 601 and the second optical axis 701 (i.e., being disposed at different heights, being inclined relative to each other, etc.), interference between the two can be avoided during testing. Further, the first optical axis 601 and the second optical axis 701 are able to detect the test objects 91 at oblique angles.

Referring to FIGS. 5 and 8, prior to a testing operation, the mapping device 500 is disposed at an initial position proximal to a top end of the supporting board 21. During the testing operation, the mapping device 500 is first driven by the lifting mechanism 3 to descend toward the container 9, and then driven by the opening-closing mechanism 4 to move to the opening position. Next, the frame driver unit 53 (see FIG. 9) is driven to pivot the frame member 52 toward the container 9, such that the first sensor group 6 and the second sensor group 7 extend into the container opening 92. Then, the mapping device 500 is further driven by the lifting mechanism 3 to gradually move along the detecting direction (D) (i.e., move downward), during which the first and second sensor groups 6, 7 begin to detect the test objects 91.

Referring to FIG. 12, the test object 91 in the normal position is represented by the circle in solid line, while the test object 91 deviating from the normal position is represented by the circle in broken line. When the second optical axis 701 detects the deviating test object 91 (i.e., wafer protrusion), a warning signal is sent out or the operation is paused, so that the second sensor 62 of the first sensor group 6 is prevented from hitting the deviating test object 91. If no wafer protrusion is detected, the first optical axis 601 can proceed to scan and obtain further information of the test objects 91 (e.g., double-stacked or cross-slotted placement, or thickness of the wafers). In such a manner, the mapping device 500 of the present embodiment, compared with the prior art that requires three sets of sensors for scanning and protrusion detection, is able to perform both scanning and protrusion detection with only two sets of sensors (i.e., the first and second sensor groups 6, 7), and thus the present embodiment has simpler structure and wiring pattern, which can reduce the area of interference among sensors.

Figure 14:
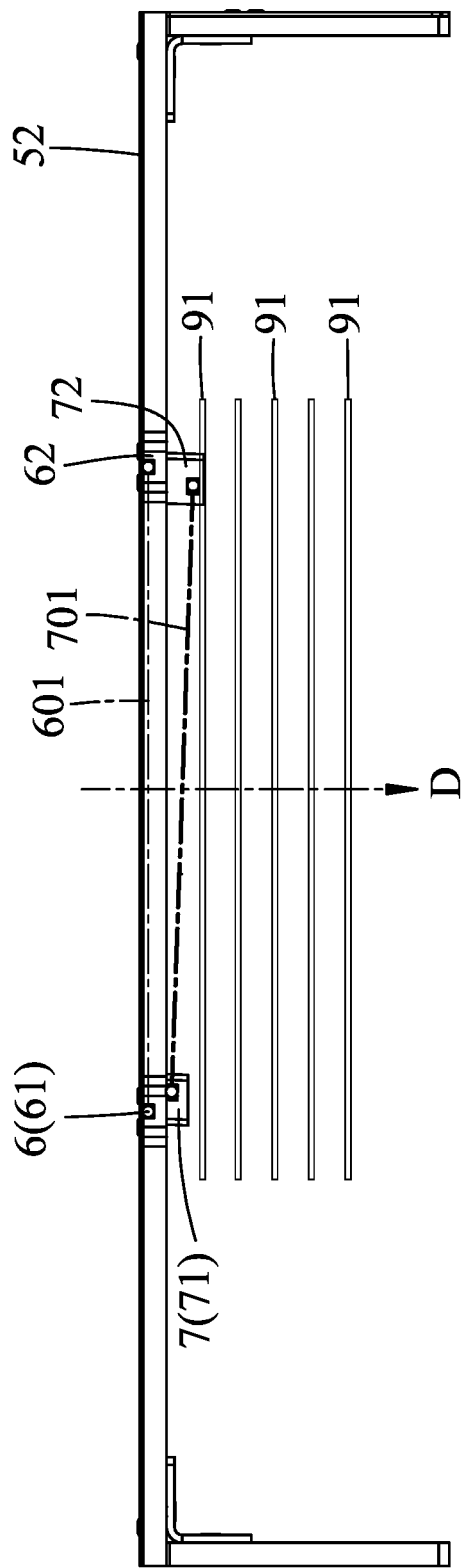
FIG. 14 is a view similar to FIG. 11, illustrating the mapping device being used for detecting small-sized test objects.
Figure 15:
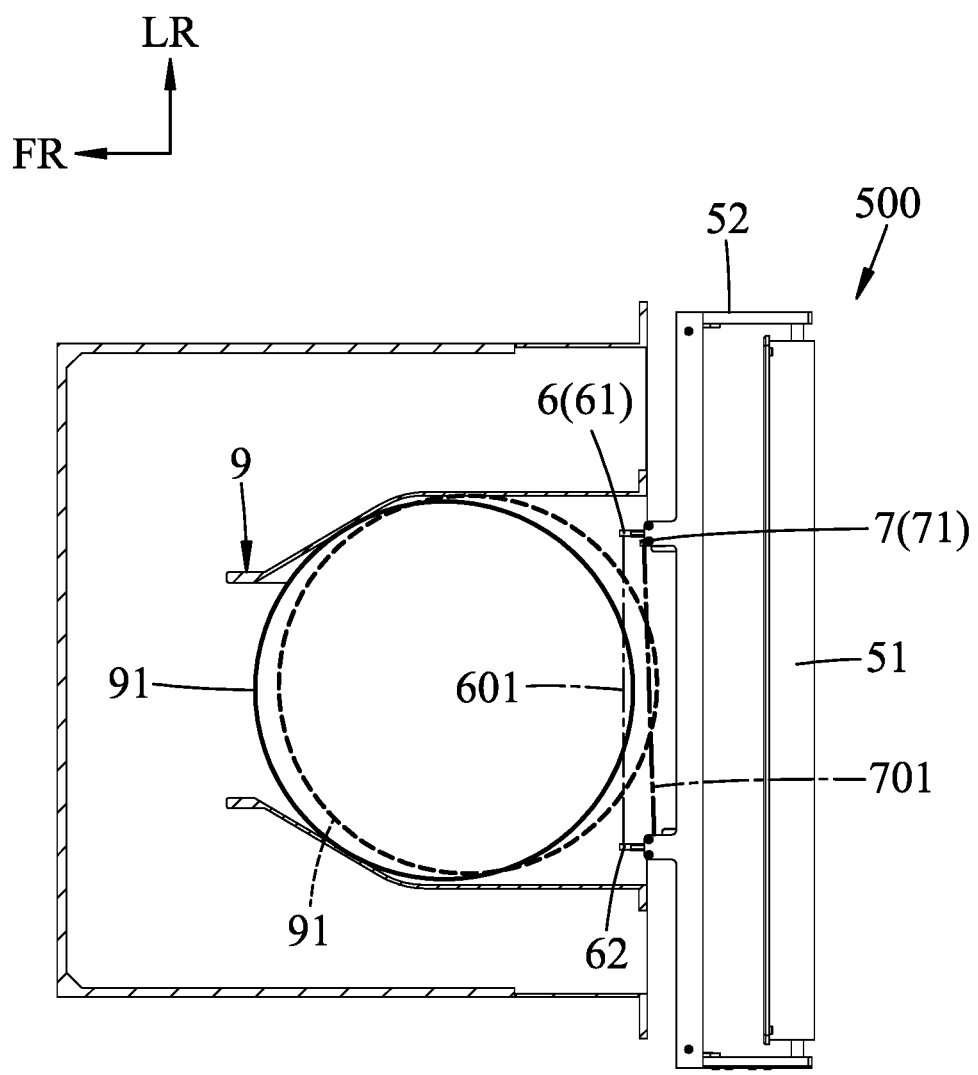
FIG. 15 is a view similar to FIG. 12, illustrating the first sensor group and the second sensor group being used for scanning and detecting wafer protrusion, respectively.

Referring to FIGS. 14 and 15, it should be noted that, aside from testing 12-inch wafers, the present embodiment may also be used for testing smaller test objects 91, such as 8-inch wafers. In this case, when the mapping device 500 moves to the open position, the frame member 52 of the mapping device 500 may be driven to extend further into the container 9 such that the first sensor group 6 and the second sensor group 7 become proximal to the smaller test objects 91, and the testing operation may proceed as mentioned above.

In FIG. 15, the test object 91 in the normal position is represented by the circle in solid line, while the test object 91 deviating from the normal position is represented by the circle in broken line. In a similar manner as mentioned above, the second optical axis 701 is used to detect the deviating test object 91 (i.e., wafer protrusion), and if no wafer protrusion is detected, the first optical axis 601 can proceed to scan and obtain further information of the test objects 91.

In summary, the present embodiment of a loadport has benefits as follows. By virtue of the asymmetrical configurations of the first optical axis 601 and the second optical axis 701 (i.e., being inclined relative to each other and disposed at different heights, etc.), the first and the second optical axes 601, 701 are able to perform both scanning and protrusion detection on the test objects 91 at oblique angles. In addition, since the present embodiment includes fewer sensors than the prior art, it has relatively simpler structure and wiring pattern, thereby reducing the area of interference among sensors. Finally, the present embodiment is capable of testing the test objects 91 of different sizes, thus providing users with great flexibility and applicability.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A mapping device adapted for detecting a plurality of test objects disposed in a container having front and rear sides and top and bottom sides, the test objects being arranged along a detecting direction, said mapping device comprising:
    a first sensor group defining a first optical axis, and adapted to be disposed at the front side of the container to move in the detecting direction relative to the container for detecting any of the test objects; and
    a second sensor group defining a second optical axis, and adapted to be disposed at the front side of the container to move in the detecting direction relative to the container for detecting any of the test objects;
    wherein said second optical axis is inclined relative to said first optical axis, is disposed ahead of said first optical axis in a front-rear direction of the container perpendicular to the detecting direction, and is disposed at a downstream side of said first optical axis in the detecting direction,
    wherein the detecting direction is the same as a top-bottom direction of the container, the top-bottom direction being parallel to a Z-axis of a coordinate system and perpendicular to a front-rear direction and a left-right direction of the container;
    wherein said first optical axis is parallel to a Y-axis of the coordinate system that is perpendicular to the Z-axis and an X-axis;
    wherein said first and second optical axes are disposed respectively at two levels that are different along the Z-axis;
    wherein said first and second optical axes form a first angle of larger than 0 degrees when being projected on a Y-Z plane;
    wherein said first and second optical axes forms a second angle of larger than 0 degrees when being projected on an X-Y plane; and
    wherein the first angle is less than or equal to 10 degrees, and the second angle is less than or equal to 5 degrees.

2. The mapping device as claimed in claim 1, wherein said first sensor group includes a first sensor and a second sensor that are spaced apart from each other in the left-right direction of the container perpendicular to a top bottom direction and a front rear direction of the container, said first sensor and said second sensor cooperatively defining therebetween said first optical axis.

3. The mapping device as claimed in claim 2, wherein:
    said second sensor group includes a third sensor and a fourth sensor that are spaced apart from each other in the left-right direction, said third sensor and said fourth sensor cooperatively defining therebetween said second optical axis; and a distance between said third sensor and said fourth sensor in the left-right direction is smaller than a distance between said first sensor and said second sensor in the left-right direction.

4. The mapping device as claimed in claim 2, wherein:
said second sensor group includes a third sensor and a fourth sensor that are spaced apart from each other in the left-right direction, said third sensor and said fourth sensor cooperatively defining therebetween said second optical axis; and
a distance between said third sensor and said fourth sensor in the detecting direction is smaller than a distance between said third sensor and said first sensor in the detecting direction, said fourth sensor being disposed farther from said first optical axis than said third sensor in the detecting direction.

5. The mapping device as claimed in claim 1, wherein said second sensor group includes a third sensor and a fourth sensor that are spaced apart from each other in the left-right direction of the container, which is perpendicular to the detecting direction, said third sensor and said fourth sensor cooperatively defining therebetween said second optical axis.

6. The mapping device as claimed in claim 5, wherein a distance between said third sensor and said fourth sensor in the detecting direction is configured to be smaller than or equal to two times of a spacing distance between any two adjacent ones of spacers that are disposed inside the container to support the test objects.

7. The mapping device as claimed in claim 5, wherein said fourth sensor is disposed farther from said first optical axis than said third sensor in the detecting direction and also in the front-rear direction of the container, which is perpendicular to the detecting direction and the left-right direction.

8. The mapping device as claimed in claim 1, further comprising a moving door that is adapted to be movable in the detecting direction relative to the container, and that includes a door member and a frame member movably connected to said door member, said first sensor group and said second sensor group being mounted to said frame member.

9. A loadport adapted for detecting a plurality of test objects disposed in a container and arranged along a detecting direction, said loadport comprising:
a base seat adapted for placement of the container; and
a mapping device including:
a first sensor group defining a first optical axis, and adapted to be disposed at the front side of the container to move in the detecting direction relative to the container for detecting any of the test objects; and
a second sensor group defining a second optical axis, and adapted to be disposed at the front side of the container to move in the detecting direction relative to the container for detecting any of the test objects;
wherein said second optical axis is inclined relative to said first optical axis, is disposed ahead of said first optical axis in a front-rear direction of the container perpendicular to the detecting direction, and is disposed at a downstream side of said first optical axis in the detecting direction,
wherein the detecting direction is the same as a top-bottom direction of the container, the top-bottom direction being parallel to a Z-axis of a coordinate system and perpendicular to a front-rear direction and a left-right direction of the container;
wherein said first optical axis is parallel to a Y-axis of the coordinate system that is perpendicular to the Z-axis and an X-axis;
wherein said first and second optical axes are disposed respectively at two levels that are different along the Z-axis;
wherein said first and second optical axes form a first angle of larger than 0 degrees when being projected on a Y-Z plane;
wherein said first and second optical axes forms a second angle of larger than 0 degrees when being projected on an X-Y plane; and
wherein the first angle is less than or equal to 10 degrees, and the second angle is less than or equal to 5 degrees, said mapping device being movable along the detecting direction relative to said base seat.

* * * * *